(12) United States Patent
Bergmeier

(10) Patent No.: US 6,327,966 B1
(45) Date of Patent: Dec. 11, 2001

(54) APPARATUS FOR BOILING EGGS

(76) Inventor: Gerd Bergmeier, Krummer Weg 4, 32120 Hiddenhausen (DE)

( * ) Notice: Subject to any disclaimer, the term of this patent is extended or adjusted under 35 U.S.C. 154(b) by 0 days.

(21) Appl. No.: 09/812,915

(22) Filed: Mar. 20, 2001

(51) Int. Cl.[7] .............................. A23L 1/00; A47J 37/12; A47J 43/20
(52) U.S. Cl. ............................. 99/327; 99/330; 99/336; 99/348; 99/404; 99/407; 99/440; 99/443 C
(58) Field of Search .......................... 99/326–336, 339, 99/340, 352, 348, 355, 403–410, 440, 443 R, 443 C, 448, 477–479, 483; 126/369, 391; 426/523, 509–511

(56) References Cited

U.S. PATENT DOCUMENTS

| | | |
|---|---|---|
| 3,642,495 | 2/1972 | Davidson et al. . |
| 3,793,937 * | 2/1974 | Lipoma ................................... 99/355 |
| 4,059,046 * | 11/1977 | Yamazaki et al. ...................... 99/355 |
| 4,862,790 * | 9/1989 | Platteschorre et al. ................ 99/353 |
| 4,875,344 * | 10/1989 | Zittel ................................... 99/330 X |
| 5,456,091 * | 10/1995 | Zittel ................................... 99/348 X |
| 5,632,195 * | 5/1997 | Zittel ................................... 99/443 C |
| 5,752,431 * | 5/1998 | Zittel ................................... 99/348 |
| 5,802,961 * | 9/1998 | Hay et al. .............................. 99/406 |
| 6,234,066 * | 5/2001 | Zittel et al. ........................... 99/348 |

* cited by examiner

*Primary Examiner*—Timothy F. Simone
(74) *Attorney, Agent, or Firm*—Henry M. Feiereisen

(57) ABSTRACT

Apparatus for boiling eggs, includes a trough-shaped duct for receiving heated water, and a screw conveyor supported in the duct for rotation about an axis of rotation. The screw conveyor is configured for advancing eggs to be boiled from a feed station on one end of the duct to a discharge station on another end of the duct through the water in the duct. Water is conducted through the duct by a water-circulating system which includes a heat exchanger for continuously maintaining the water at a desired temperature. The water-circulating system has a plurality of water inlet ports which are spaced over the length of the duct and directed transversely to the longitudinal duct axis, with the water inlet ports terminating into the duct underneath the axis of rotation of the screw conveyor.

18 Claims, 4 Drawing Sheets

APPARATUS FOR BOILING EGGS

BACKGROUND OF THE INVENTION

The present invention relates, in general, to an apparatus for boiling eggs, and more particularly to an apparatus of a type having a container for receiving heated water, and a transport unit for advancing eggs to be boiled through the water in the container, whereby water is conducted through the container in a loop and maintained continuously at a desired temperature by a heat exchanger.

Apparatuses of this type are used commercially to boil large amounts of eggs for commercial production of, for example, egg salad, potato salad or the like. For economical reasons, such apparatus should operate at high output, e.g. for boiling thousands of eggs per hour. Conventional apparatuses for boiling eggs have shortcomings because of their very complex structure and overall great dimensions.

It would therefore be desirable and advantageous to provide an improved egg boiling apparatus which obviates prior art shortcomings and has a compact size and is simple in structure while yet operates at high performance.

SUMMARY OF THE INVENTION

The present invention provides for an apparatus for boiling eggs, including a trough-shaped duct defined by a longitudinal axis and receiving heated water, a screw conveyor supported in the channel for rotation about an axis of rotation, with the screw conveyor configured for advancing eggs to be boiled from a feed station on one end of the duct to a discharge station on another end of the duct through the water in the duct, and a water-circulating system for circulating water through the duct, with the water-circulating system including a heat exchanger for continuously maintaining the water at a desired temperature, and provided with a plurality of water inlet ports spaced over a length of the duct and directed transversely to the longitudinal axis, whereby the water inlet ports terminate in the duct underneath the axis of rotation of the screw conveyor.

An apparatus for boiling eggs in accordance with the present invention has many advantages. For one, the duct required for boiling the eggs can have a compact size as the effective boiling time, commensurate with the retention period of the eggs in the heated water, can be determined by the rotation speed and transport capacity of the screw conveyor, regardless of the length of the duct. As a consequence of its simple configuration, the apparatus is also less susceptible to failure even when operated over an extended period. Moreover, the arrangement of the water inlet ports in accordance with the present invention prevents a wedging of eggs because the eggs are continuously exposed to a water stream. Thus, even when a relatively great number of eggs amass between individual turns of the screw conveyor, the eggs are prevented from pushing one another out of the heated water, so that the eggs are assured from being immersed continuously in the heated water during their passage through the duct.

According to another feature of the present invention, the duct has at least one water return port adjacent the feed station at least in an area of a first, complete screw turn of the screw conveyor. Thus, the water return port is provided in the area of the duct that is in proximity of the entry of the eggs. As a consequence of the water circulation, the comparably lowest water temperature is applied in the feed zone of the eggs, thereby reducing the risk that eggs crack, when dipping into the hot water. Moreover, since the water return port is shifted forwardly to such a degree as to be positioned at least in the area of the first, complete screw turn of the screw conveyor, strong turbulences are avoided that could interfere with a pick-up of the eggs by the screw conveyor, thereby eliminating the risk that a number of eggs will not reach, or only at substantial delay, into the engagement area of the screw conveyor.

According to another feature of the present invention, the screw conveyor has one end adjacent to the discharge station, with this one end carrying scoop-like discharge blades for moving boiled eggs out of the duct to a subsequent transport unit. The discharge blades operate in synchronism with the working speed of the screw conveyor so that boiled eggs are discharged at the working speed of the screw conveyor from the duct and the water bath.

According to another feature of the present invention, eggs to be boiled are introduced in controlled manner into the duct via a rotary feeder, positioned in an area of the feed station, and an inlet chute, extending tangent to the rotary feeder into a bottom zone of the duct at an inclination to a vertical.

BRIEF DESCRIPTION OF THE DRAWING

Other features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
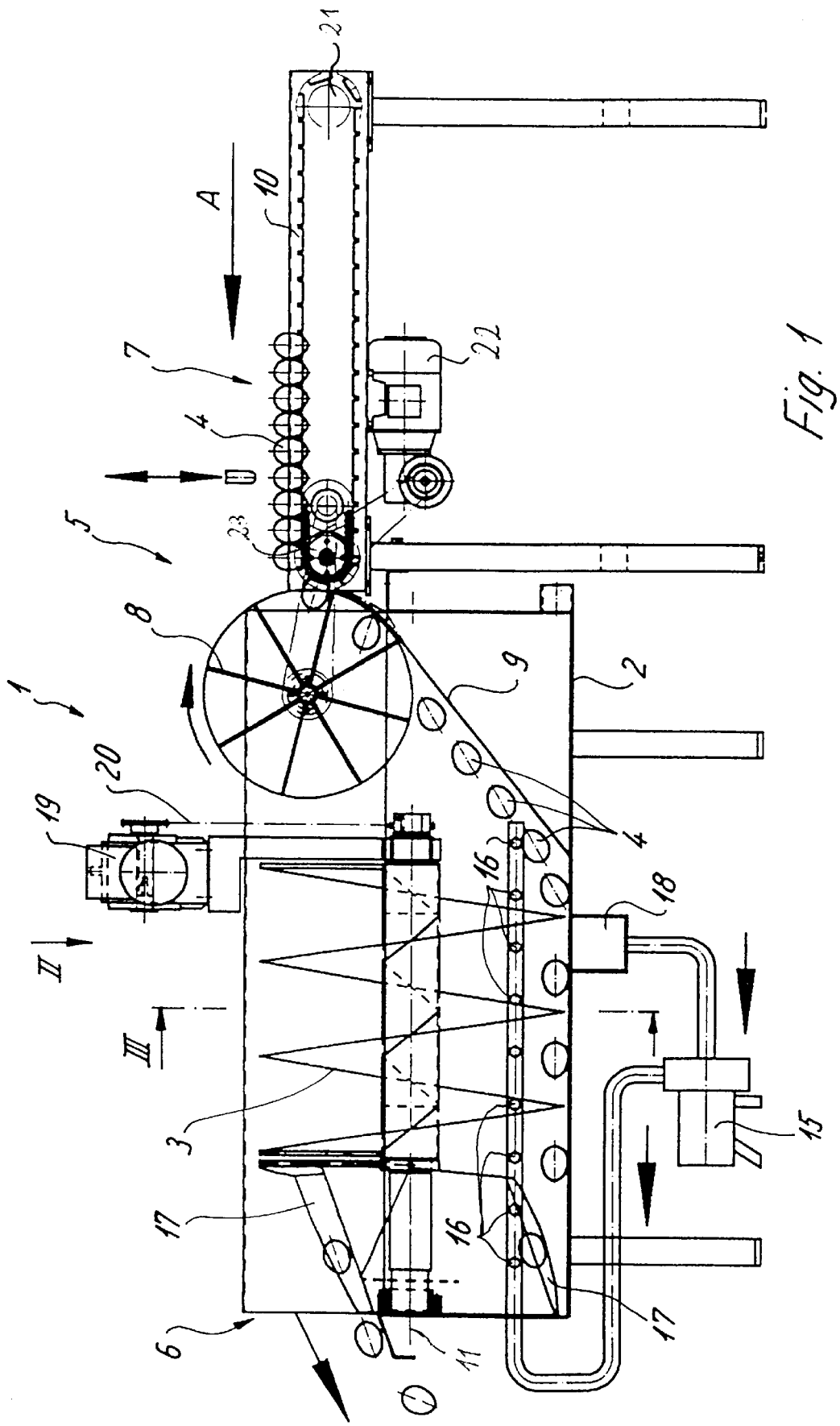
FIG. 1 is a simplified, schematic sectional view of an apparatus for boiling eggs according to the present invention.

Throughout all the Figures, same or corresponding elements are generally indicated by same reference numerals.

Turning now to the drawing, and in particular to FIG. 1, there is shown a schematic sectional view of an apparatus for boiling eggs according to the present invention, generally designated by reference numeral 1. The apparatus 1 includes a container in the form of an elongate trough-shaped duct 2 and a transport unit in the form of a screw conveyor 3 which is supported for rotation in a direction B (FIG. 3) about a longitudinal rotation axis 11. A drive motor 19 operates the screw conveyor 3 via a power transmission element 20, such as a chain or belt. For ease of illustration, the drive motor 19 is omitted in FIG. 2. The screw conveyor 3 is received in the duct 2 and conveys eggs 4 from a feed station, generally designated by reference numeral 5, through the duct 2 toward a discharge station, generally designated by reference numeral 6 and thus out of the duct 2. The feed station 5 forms the interface between the egg-boiling apparatus 1 and a feed unit, generally designated by reference numeral 7 and positioned upstream of the apparatus 1.

Positioned in the area of the feed station 5, the apparatus 1 includes a rotary feeder 8 for feeding and dosing the eggs 4 onto an inlet chute 9 which slants tangentially to the rotary feeder 8 into the bottom zone of the duct 2.

Figure 3:
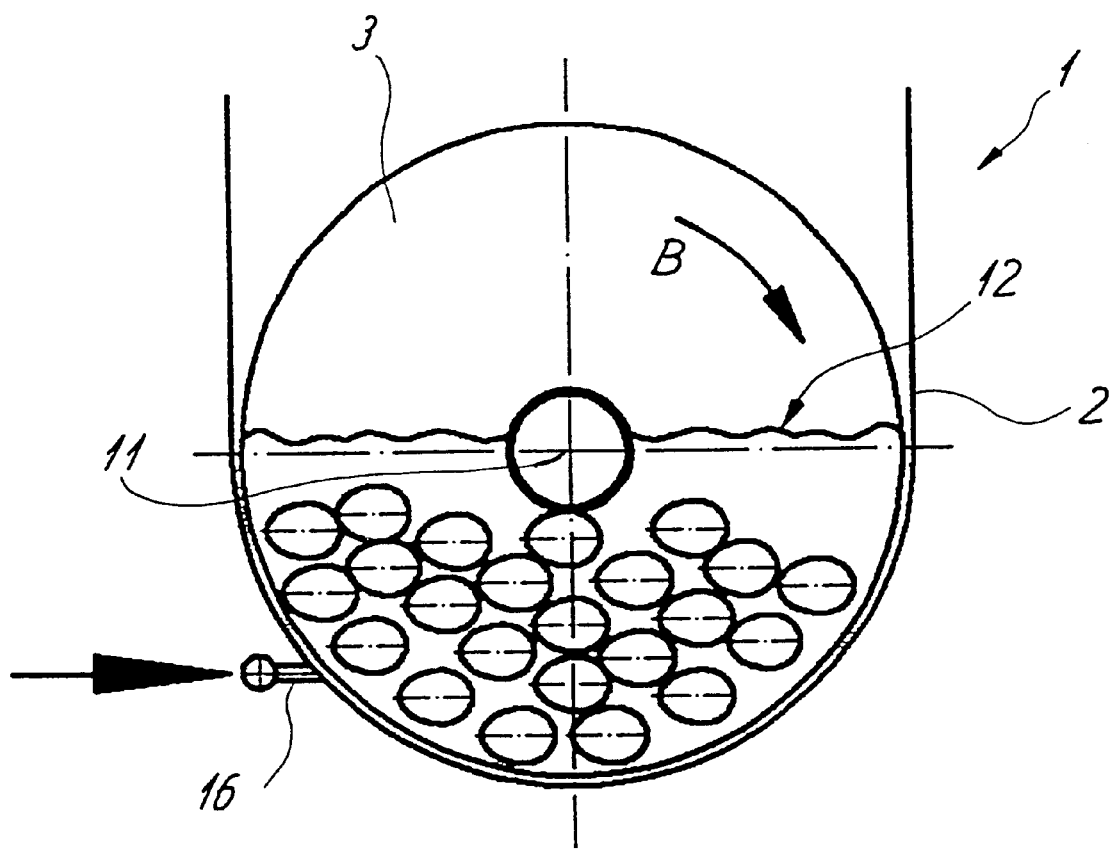
FIG. 3 is a schematic sectional view of the apparatus, taken along the line III—III in FIG. 1.

The feed unit 7 includes a conveyor band 10 looped around suitable rollers 21 to transport eggs to be boiled in an operating direction, indicated by arrow A. The conveyor band 10 is driven by a motor 22 which is connected by a belt 24 to a drive pulley 23 about which the conveyor band 10 is trained. The conveyor band 10 is subdivided in pockets for transporting the eggs 4 to the rotary feeder 8 for subsequent placement onto the inlet chute 9. The transfer zone between the rotary feeder 8 and the inlet chute 9 is positioned at about the level of the rotation axis 11 of the screw conveyor 3. Approximately to this level, the duct 2 is also filled with water. The water level during operation is indicated in FIG. 3 by reference numeral 12. Thus, the transfer of eggs 4 from the rotary feeder 8 to the inlet chute 9 is implemented approximately in the area of the water level 12 or slightly thereabove so as to realize a careful introduction of eggs 4 into the apparatus 1, without risking damage to the egg shells.

Figure 2:
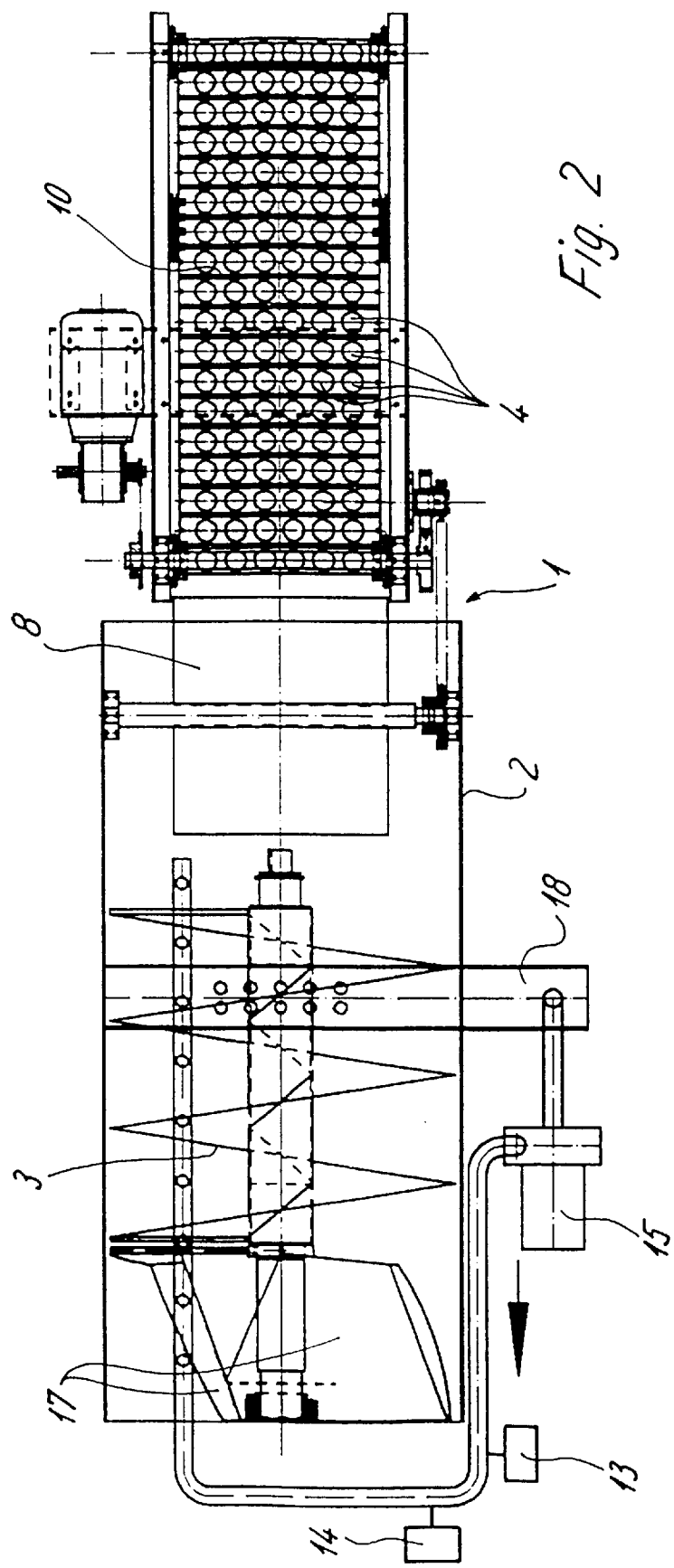
FIG. 2 is a schematic top view in the direction of arrow II in FIG. 1.

As shown in conjunction with FIG. 2, water contained in the trough-shaped duct 2 is circulated by a powerful pump 15, shown only schematically, in a loop and cleaned outside of the duct 2 by a filter 13. A heat exchanger 14, shown only schematically, heats the circulating water continuously to a desired temperature. The water circulation system includes several water inlet ports 16 for introducing water into the duct 2. The water inlet ports 16 extend transversely to the longitudinal axis of the duct 2 and are positioned underneath the rotation axis 11 of the screw conveyor 2. Water introduced through the ports 16 prevents a wedging of eggs 4 with one another in the regions between individual screw turns of the screw conveyor 3 and prevents the screw conveyor 3 from upwardly moving the eggs 4 out of the water bath in the duct 2. As best seen from FIG. 3, the water inlet ports 16 are so arranged as to be directed in opposition to the screw conveyor 3.

The screw conveyor 3 has in the area of the discharge station 6 one end carrying scoop-like discharge blades 17 for moving boiled eggs 4 out of the duct 2 to a subsequent, not shown, transport unit. As the discharge blades 17 are coupled to the screw conveyor 3, the boiled eggs 4 are discharged from the duct 2 at a same pace as conveyed by the screw conveyor 3.

Hot water introduced into the trough-shaped duct 2 in the described manner exits the duct 2 through a water return port 18 located near the feed station 5 at least in a zone of the first, complete screw turn of the screw conveyor 3. In this way, disturbances during receipt of eggs 4 introduced into the duct 2 are avoided in the active zone of the screw conveyor 3. The described water circulation creates also a temperature gradient in the direction of the transfer station 5, i.e. the water temperature is at the lowest in the feed area of the eggs 4. Therefore, the risk that eggs will crack when introduced into the water is fairly low.

Through adjusting the rotation speed of the screw conveyor 3, the transport velocity and thus the retention period of the eggs 4 in the duct can be determined. By changing the rotation speed of the screw conveyor 3, the effective cooking time can be set at almost any desired length.

Figure 4:
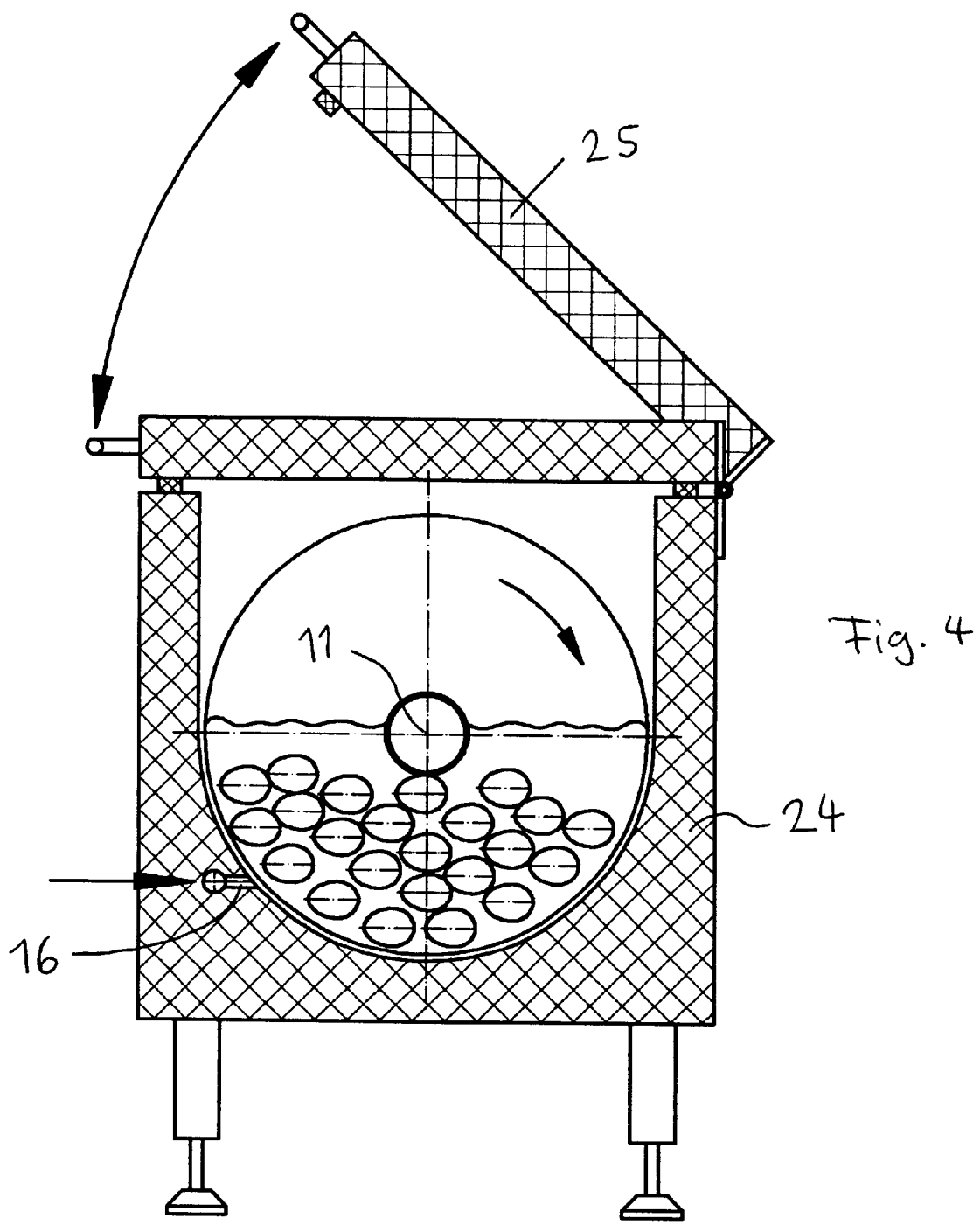
FIG. 4 is a schematic representation of the apparatus accommodated in a enclosing container.

To prevent heat losses in the area of the duct 2, it may be suitable to enclose the duct 2 by an insulating container 24, as shown in FIG. 4. It may also be suitable for same reasons of heat insulation, to cover the open top of the trough-shaped duct 2 by a swingable lid 26 which extends across the entire apparatus 1 and may be configured of several shutters that can individually opened and closed. Of course, it is certainly within the scope of the present invention, to combine several of such trough-shaped ducts 2 with respective screw conveyors 3 in parallel side-by-side disposition to a larger assembly. In this case, it is possible to use the single drive motor 19 to drive several screw conveyors 3.

While the invention has been illustrated and described as embodied in an apparatus for boiling eggs, it is not intended to be limited to the details shown since various modifications and structural changes may be made without departing in any way from the spirit of the present invention.

What is claimed as new and desired to be protected by Letters Patent is set forth in the appended claims.

What is claimed is:

1. Apparatus for boiling eggs, comprising:
   a trough-shaped duct defined by a longitudinal axis and receiving heated water;
   a screw conveyor supported in the duct for rotation about an axis of rotation, said screw conveyor configured for advancing eggs to be boiled from a feed station on one end of the duct to a discharge station on another end of the duct through the water in the duct; and
   a water-circulating system for circulating water through the duct, said water-circulating system including a heat exchanger for continuously maintaining the water at a desired temperature, said water-circulating system having a plurality of water inlet ports spaced over a length of the duct and directed transversely to the longitudinal axis of the duct, said water inlet ports terminating in the duct underneath the axis of rotation of the screw conveyor.

2. The apparatus of claim 1, wherein the duct has at least one water return port adjacent to the feed station and located at least in an area of a first, complete screw turn of the screw conveyor.

3. The apparatus of claim 1, wherein the screw conveyor has one end adjacent to the discharge station, said one end carrying scoop-like discharge blades for moving boiled eggs out of the duct to a subsequent transport unit.

4. The apparatus of claim 1, and further comprising a rotary feeder, positioned in an area of the feed station, and an inlet chute extending tangent to the rotary feeder into a bottom zone of the duct at an inclination to a vertical.

5. The apparatus of claim 1 wherein the duct is embedded in an insulating container.

6. The apparatus of claim 1 wherein the duct has an open top, and further comprising at least one shutter for covering the open top of the duct.

7. Apparatus for boiling eggs, comprising:
   a container for receiving a heated water bath;
   a screw conveyor for advancing eggs through the water bath in a duct, said screw conveyor supported in the duct for rotation about a rotation axis and so configured as to allow adjustment of a rotation speed and thereby control a retention time of the eggs in the water bath; and
   a water-circulating system for circulating heated water through the duct, said water-circulating system including a plurality of water inlet ports spaced over a length of the duct underneath the rotation axis of the screw conveyor and directed transversely to the screw conveyor.

8. The apparatus of claim 7, wherein the container is a trough-shaped duct.

9. The apparatus of claim 7, wherein the duct has at least one water return port located at least in an area of a first, complete screw turn of the screw conveyor.

10. The apparatus of claim 7, wherein the screw conveyor has one end carrying scoop-like discharge blades for moving boiled eggs out of the duct.

11. The apparatus of claim 7, and further comprising a rotary feeder, positioned in an inlet area of the container, and a slanted inlet chute extending from the rotary feeder into a bottom zone of the container.

12. Apparatus for boiling eggs, comprising:

means for containing a heated water bath;

a screw conveyor for advancing eggs through the water bath in a duct, said screw conveyor supported in the duct for rotation about a rotation axis and so configured as to allow adjustment of a rotation speed and thereby control a retention time of the eggs in the water bath; and a water-circulating system for circulating heated water through the duct.

13. The apparatus of claim 12, wherein the containing means includes a trough-shaped duct.

14. The apparatus of claim 12, wherein the water-circulating system includes a pipeline terminating in a pipe section provided with plurality of water inlet ports spaced over a length of the containing means underneath the rotation axis of the screw conveyor and directed transversely to the screw conveyor.

15. The apparatus of claim 14, wherein the water-circulating system includes a pump disposed in the pipeline outside the containing means for circulation of water, and a heat exchanger outside the containing means for maintaining the water at a desired temperature.

16. The apparatus of claim 15, wherein the containing means has at least one water return port located at least in an area of a first, complete screw turn of the screw conveyor and fluidly connected to the pipeline.

17. The apparatus of claim 12, wherein the screw conveyor has one end carrying scoop-like discharge blades for moving boiled eggs out of the containing means.

18. The apparatus of claim 12, and further comprising a rotary feeder, positioned in an inlet area of the containing means, and a slanted inlet chute extending from the rotary feeder into a bottom zone of the containing means.

* * * * *